Patented June 23, 1925.

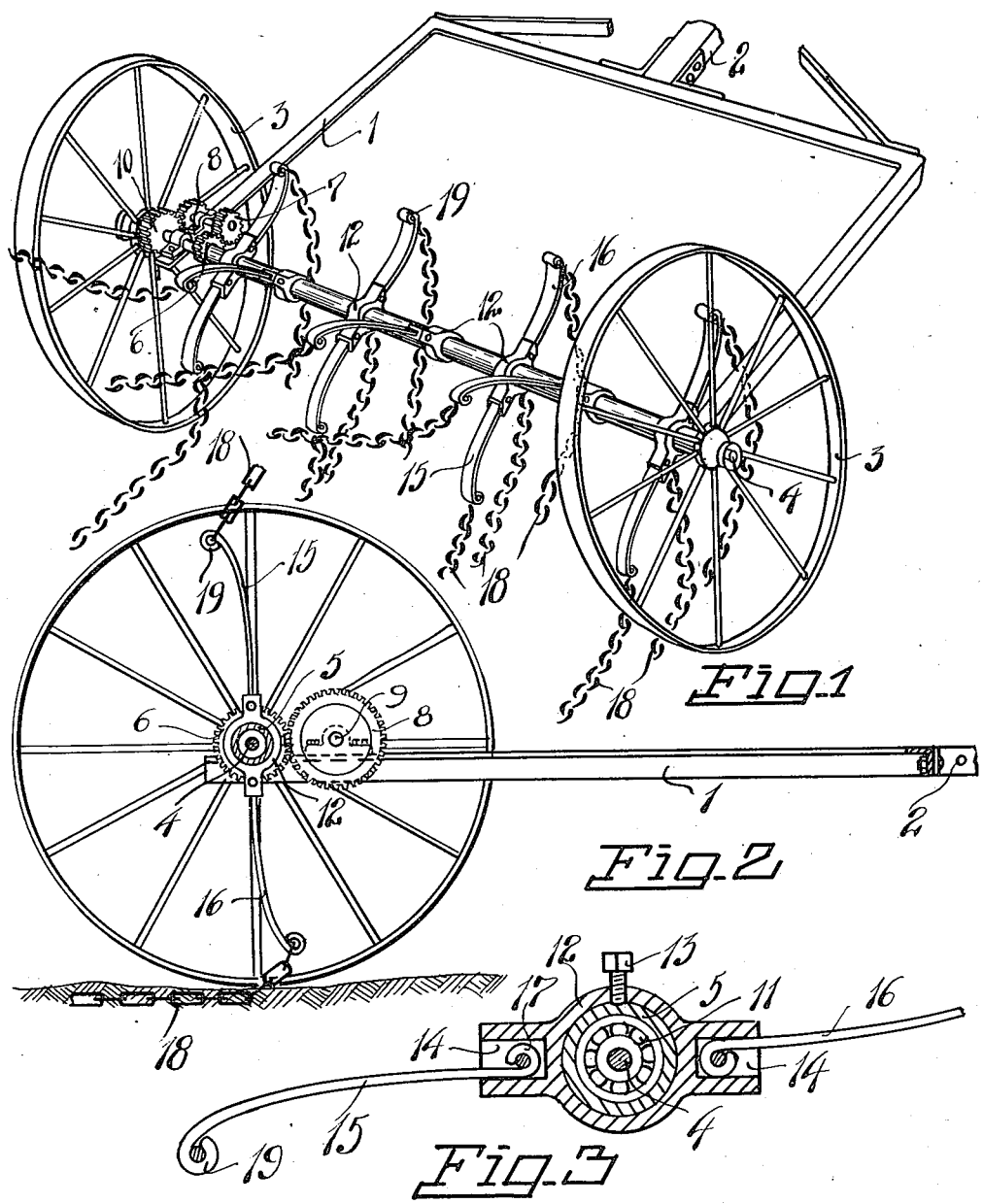

1,542,963

UNITED STATES PATENT OFFICE.

WILLIAM K. RUSSELL, OF SHARON, WASHINGTON.

CULTIVATOR.

Application filed January 27, 1925. Serial No. 5,001.

*To all whom it may concern:*

Be it known that I, WILLIAM K. RUSSELL, a citizen of the United States, residing at Sharon, in Spokane County, and State of Washington, have invented certain new and useful Improvements in Cultivators, of which the following is a specification.

The present invention relates to improvements in cultivators of the wheeled type adapted for use in breaking clods, pulverizing the soil and packing the latter for expressing or forcing air from the surface of the soil after seed has been planted therein.

The invention contemplates the use of a rotary member carrying flexible beaters or chains which are employed to beat and drag over the surface of the soil under cultivation, and it consists in certain novel features of construction and combinations of parts as hereinafter more fully specified and claimed.

In the accompanying drawings I have illustrated one complete example of the physical embodiment of my invention wherein the parts are combined and arranged in accordance with the best mode I have thus far devised for the practical application of the principles of my invention.

Figure 1 is a perspective view of the cultivator of my invention.

Figure 2 is a vertical longitudinal sectional view of the implement showing one of the flexible beaters or chains passing or dragging through the soil.

Figure 3 is an enlarged detail sectional view through the axle of the vehicle or implement showing also one of the pairs of beater arms and connections.

In the preferred form of my invention I employ a two wheeled implement that may horsedrawn and is of simple construction. In carrying out my invention I utilize a U-shaped frame 1 that may be made up of angle irons and provided with a draft tongue 2 part of which is indicated in the drawings. A pair of traction wheels 3 are secured to revolve with the round axle 4 which is journaled to revolve in bearings on the rear end of the U-shaped frame.

Upon the rotatable, rounded, axle is mounted a tubular shaft 5 of suitable length and located between the pair of traction wheels. This tubular shaft is adapted to revolve on the round axle in the direction of the movement of the axle and the latter is geared to the former to impart this rotary motion. At one end of the tubular shaft a pinion 6 is carried which pinion is revolved by action of a pinion 7 located in front of the shaft-pinion. A second pinion 8 is carried with the pinion 7 on the short countershaft 9 that is journaled on the frame of the implement, and a driving pinion 10 on the axle operates these intermediate gears 7 and 8 to revolve the driven gear or pinion 6 and tubular shaft at a greater speed than that of the rotation of the axle.

To facilitate the relative rotary movement of the axle and shaft anti-friction ball bearings 11, as indicated in Figure 3 are utilized between the axle and shaft.

Spaced at regular intervals on the tubular shaft are a number of beaters, each of which includes an adjustable collar or casting 12 adapted to fit on the periphery of the tubular shaft and slidable longitudianlly of the shaft for adjustment. Set bolts or screws 13 are employed to secure the collars in adjusted spaced relation along the shaft.

Each of the collars is provided with a pair of sockets 14 preferably arranged in diametrical alinement and projecting laterally from the collar. A flat, metallic spring arm as 15 and 16 is carried in each of these sockets and pivoted loosely therein on a pin 17. The inner end of each arm is formed with an eye or loop for the pivot pin or bolt and the interior of the socket is of such dimensions as to permit a limited swinging movement of the arm on the pivot pin, said swinging movement being in a vertical plane. Thus as the tubular shaft revolves the collars swing the arms through a vertical plane, and in addition to this movement the arms are permitted to have a limited swinging movement relatively to the sockets in which they are carried.

At the free end of each arm is carried a flexible beater 18, here shown as a chain attached by suitable means to an eye or loop 19 fashioned at the free end of each arm.

The beaters are spaced at suitable intervals along the shaft and the required number of beaters is employed to insure adequate means for beating or cultivating a comparatively wide area of the soil as the implement advances. The spring arms and flexible chains perform a function similar to a whip, the latter striking the soil with a sharp blow and then being dragged over the soil as the arm rotates and finally lifted from the ground. The weight of the chains and the friction due to the dragging action of the chains on the soil as the shaft revolves causes the spring arms to flex, then when the arms are freed from this retarding or dragging factor, their resiliency causes a jerk that adds to the impulse on the chain for again striking the ground. The centrifugal action of course swings the chains freely through the air as the shaft rotates.

Having thus fully described my invention, what I claim as new and desire to secure by Letters Patent is—

1. The combination in an implement as described with a frame, axle and a traction wheel rotatable with the axle, of a tubular shaft on said axle and power transmission connections between said axle and shaft, a series of arms carried by said shaft, and flexible beaters carried at the ends of said arms.

2. The combination with a rotary axle and wheels, of a tubular shaft on the axle, a series of adjustable heads on said shaft, a pair of diametrically arranged loosely pivoted arms carried by each head, flexible beaters carried at the free ends of said arms, and power transmission means between said axle and shaft.

3. The combination with a rotary axle and wheels, of a tubular shaft mounted to revolve on the axle and power transmission devices therebetween, a series of adjustable collars spaced on said shaft having diametrically arranged pairs of sockets, a spring arm pivoted in each socket and having a limited relative movement therein, and a chain carried at the free end of each arm.

In testimony whereof I affix my signature.

WILLIAM K. RUSSELL.